United States Patent
Schilling et al.

(10) Patent No.: US 11,718,136 B2
(45) Date of Patent: Aug. 8, 2023

(54) BEARING ARRANGEMENT FOR A DAMPER BEARING OF A SHOCK ABSORBER AND METHOD FOR INSTALLATION OF A DAMPER BEARING ON A VEHICLE BODY

(71) Applicant: Volkswagen Aktiengesellschaft, Wolfsburg (DE)

(72) Inventors: Thomas Schilling, Sassenburg (DE); Werner Krauth, Wolfsburg (DE); Nicole Wallmann, Knesebeck (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 130 days.

(21) Appl. No.: 17/534,052

(22) Filed: Nov. 23, 2021

(65) Prior Publication Data

US 2022/0080797 A1 Mar. 17, 2022

Related U.S. Application Data

(63) Continuation of application No. PCT/EP2020/062934, filed on May 8, 2020.

(30) Foreign Application Priority Data

May 29, 2019 (DE) ...................... 10 2019 207 872.9

(51) Int. Cl.
*B60G 13/00* (2006.01)
*B62D 25/08* (2006.01)
(Continued)

(52) U.S. Cl.
CPC ......... *B60G 13/003* (2013.01); *B62D 25/088* (2013.01); *B62D 65/024* (2013.01);
(Continued)

(58) Field of Classification Search
CPC ............ B60G 13/003; B60G 2204/128; B60G 2204/44; B60G 2206/8207;
(Continued)

(56) References Cited

U.S. PATENT DOCUMENTS 5,375,870 A * 12/1994 Smith .................. B60G 15/067
280/124.109

FOREIGN PATENT DOCUMENTS

CN 106467143 A * 3/2017 ........... B62D 25/088
DE 69407331 T2 4/1998
(Continued)

OTHER PUBLICATIONS

English Translation and Original Doc for DE 102010006279 A1 Torster Hans-Dieter et al. retrieved 2023 (Year: 2010).*
(Continued)

*Primary Examiner* — Paul N Dickson
*Assistant Examiner* — Caitlin Anne Miller
(74) *Attorney, Agent, or Firm* — Muncy, Geissler, Olds & Lowe, P.C.

(57) ABSTRACT

A bearing arrangement for a damper bearing of a shock absorber in a wheelhouse of a vehicle. A damper receptacle is formed in a wheelhouse sheet metal part delimiting the wheelhouse. A threaded bolt is guided through a damper bearing screw hole and through a screw hole of the damper receptacle and the bolt tip of the threaded bolt is screwed together with an internal thread of a reinforcement element which is arranged on the side of the damper receptacle. A positioning aid is associated with the damper receptacle, via which positioning aid the damper bearing of the shock absorber can be pre-positioned in an assembly process up to an installation position in which the screw hole of the damper bearing, the screw hole of the damper receptacle,
(Continued)

and the reinforcement element internal thread are oriented flush with respect to each other in a screw direction.

8 Claims, 6 Drawing Sheets

(51) Int. Cl.
*B62D 65/02* (2006.01)
*B62D 65/12* (2006.01)

(52) U.S. Cl.
CPC ........ *B62D 65/12* (2013.01); *B60G 2204/128* (2013.01); *B60G 2204/44* (2013.01); *B60G 2206/8207* (2013.01); *B60G 2206/91* (2013.01)

(58) Field of Classification Search
CPC .......................... B60G 2206/91; B62D 25/088; B62D 65/024; B62D 65/12; F16F 9/54
USPC ...................................... 280/124.15; 267/294
See application file for complete search history.

(56) References Cited

FOREIGN PATENT DOCUMENTS

| | | |
|---|---|---|
| DE | 19909283 A1 | 9/2000 |
| DE | 10349878 A1 | 6/2005 |
| DE | 10255296 B4 | 4/2010 |
| DE | 102010014508 A1 | 11/2010 |
| DE | 102010006279 A1 | 8/2011 |
| DE | 102010030814 A1 | 1/2012 |
| DE | 102015014410 A1 | 5/2016 |
| DE | 102017002814 A1 | 9/2018 |
| FR | 3056130 A1 | 3/2018 |

OTHER PUBLICATIONS

International Search Report dated Oct. 16, 2020 in corresponding application PCT/EP2020/062934.

* cited by examiner

BEARING ARRANGEMENT FOR A DAMPER BEARING OF A SHOCK ABSORBER AND METHOD FOR INSTALLATION OF A DAMPER BEARING ON A VEHICLE BODY

This nonprovisional application is a continuation of International Application No. PCT/EP2020/062934, which was filed on May 8, 2020, and which claims priority to German Patent Application No. 10 2019 207 872.9, which was filed in Germany on May 29, 2019, and which are both herein incorporated by reference.

BACKGROUND OF THE INVENTION

Field of the Invention

The present invention relates to a bearing arrangement for a damper bearing of a shock absorber in a wheelhouse of a vehicle according and to a method for installing a damper bearing of this type in the vehicle wheelhouse.

Description of the Background Art

A shock absorber is part of a vehicle chassis which is connected to the vehicle body from below the vehicle in an assembly process step in the vehicle manufacturing plant. In the assembly process step, the shock absorber is pre-positioned in its installation position using a positioning aid. The shock absorber, which is pre-positioned in its installation position, is then screwed to a damper receptacle on the body side via its damper bearing.

In a generic bearing arrangement, the damper receptacle is part of a wheelhouse sheet metal part delimiting the wheelhouse and is screw-connected to the damper bearing of the shock absorber. In the screw connection, a screw bolt is guided through a damper bearing screw hole and through a screw hole in the damper receptacle and screwed with its bolt tip to an internal thread of a reinforcement element. The reinforcement element can be a threaded plate which is disposed on the damper receptacle side facing away from the wheelhouse.

In the assembly process step, when the installation position is reached, the damper bearing screw hole, the screw hole of the damper receptacle, and the internal thread of the threaded plate are oriented flush with respect to each other in the screw direction. Due to component and/or production tolerances, there is the problem that the screw holes and the internal thread of the threaded plate are slightly out of alignment with one another in the installation position, whereby a screw connection of the damper bearing without interfering contours can be negatively affected.

A method for aligning two components relative to each other is known from DE 10 2010 014 508 A1. A device for fastening a component is known from DE 102 55 296 B4.

SUMMARY OF THE INVENTION

It is therefore an object of the present invention to provide a bearing arrangement and an installation method by means of which, in comparison to the prior art, a process-reliable screw connection of the damper bearing without interfering contours to the vehicle body is made possible.

According to an example, the positioning aid, by means of which the damper bearing is pre-positioned in the installation position in the assembly process step, is a material-uniform and/or integral component of the reinforcement element (i.e., the threaded plate). In this way, a relative position between the positioning aid and the reinforcement element internal thread is fixed, specifically independent of component and/or production tolerances in the body-side damper receptacle and/or in the wheelhouse sheet metal part. As a result, a tolerance chain in the assembly process step is reduced in a structurally simple manner, so that, in comparison to the prior art, a screwing together of the damper bearing without interfering contours is made possible largely independently of production and/or component tolerances.

In a technical implementation, the wheelhouse sheet metal part can have a shell-shaped sheet metal base body which delimits the wheelhouse. From the shell-shaped sheet metal base body, at least one sheet metal embossment, forming the damper receptacle, can protrude into the wheelhouse. The damper receptacle can have a screw-on wall, directed towards the vehicle bottom, with a joining surface. In the assembled position, this is in flat contact with a mounting flange of the damper bearing. The screw holes through which the screw bolt is guided can be formed both in the screw-on wall of the damper receptacle and in the damper bearing mounting flange.

In a technical realization, the reinforcement element can be a threaded plate which has a threaded hole with an internal thread. Alternatively, a weld nut into which the screw bolt can be screwed can also be connected to the threaded plate. The threaded plate can be in loose contact with the side of the screw-on wall of the damper receptacle, said side facing away from the damper bearing. When the screw connection is tightened, the damper bearing mounting flange and the screw-on wall of the damper receptacle can therefore be clamped between the threaded plate and a bolt head of the screw bolt.

The reinforcement element can have a threaded plate base body from which a sheet metal tab is angled at a bending edge and acts as a positioning aid. The sheet metal tab of the threaded plate can be guided through a through-opening in the damper receptacle and protrude into the wheelhouse.

The screw-on wall of the damper receptacle can merge into the shell-shaped sheet metal base body at a sheet metal transition or at a transition edge towards the vehicle bottom. It is preferred if, in the vehicle transverse direction, the mounting flange of the bearing housing is disposed between the positioning sheet metal tab and the transition edge defined above.

Also, two regions (hereinafter referred to as sheet metal embossments) can be provided for the threaded plates in the damper receptacle. The sheet metal embossments of the damper receptacle can be spaced from one another by a longitudinal clearance in the vehicle longitudinal direction. Each sheet metal embossment of the damper receptacle can be screw-connected to a mounting flange of the damper bearing, wherein a bearing housing upper side of the damper bearing can protrude without contact into the longitudinal clearance between the two sheet metal embossments of the damper receptacle.

The bearing housing of the damper bearing can have a counter-contour that corresponds to the positioning sheet metal tabs. Against this background, the bearing housing can have a longitudinal stop element which, when the shock absorber is correctly positioned, is arranged in longitudinal alignment between the two positioning sheet metal tabs of the threaded plates. In this case, the longitudinal stop element of the bearing housing, when viewed in the vehicle longitudinal direction, is arranged between the facing cut edges of the positioning sheet metal tabs.

In the assembly process step, the shock absorber, not yet mounted on the vehicle body, is first guided from below the vehicle into the wheelhouse up to its installation position. In this case, the housing upper part of the damper bearing can slide toward the vehicle top along the shell-shaped sheet metal base body. When the installation position is reached, the two mounting flanges of the damper bearing are brought into abutment with the two positioning sheet metal tabs of the threaded plates and in flat contact with the two screw-on walls of the sheet metal embossments of the damper receptacle. In addition, the longitudinal stop element of the damper bearing is brought into longitudinal alignment between the two positioning sheet metal tabs of the threaded plates. Therefore, in a subsequent process step, the damper bearing can be screwed to the damper receptacle without interfering contours.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
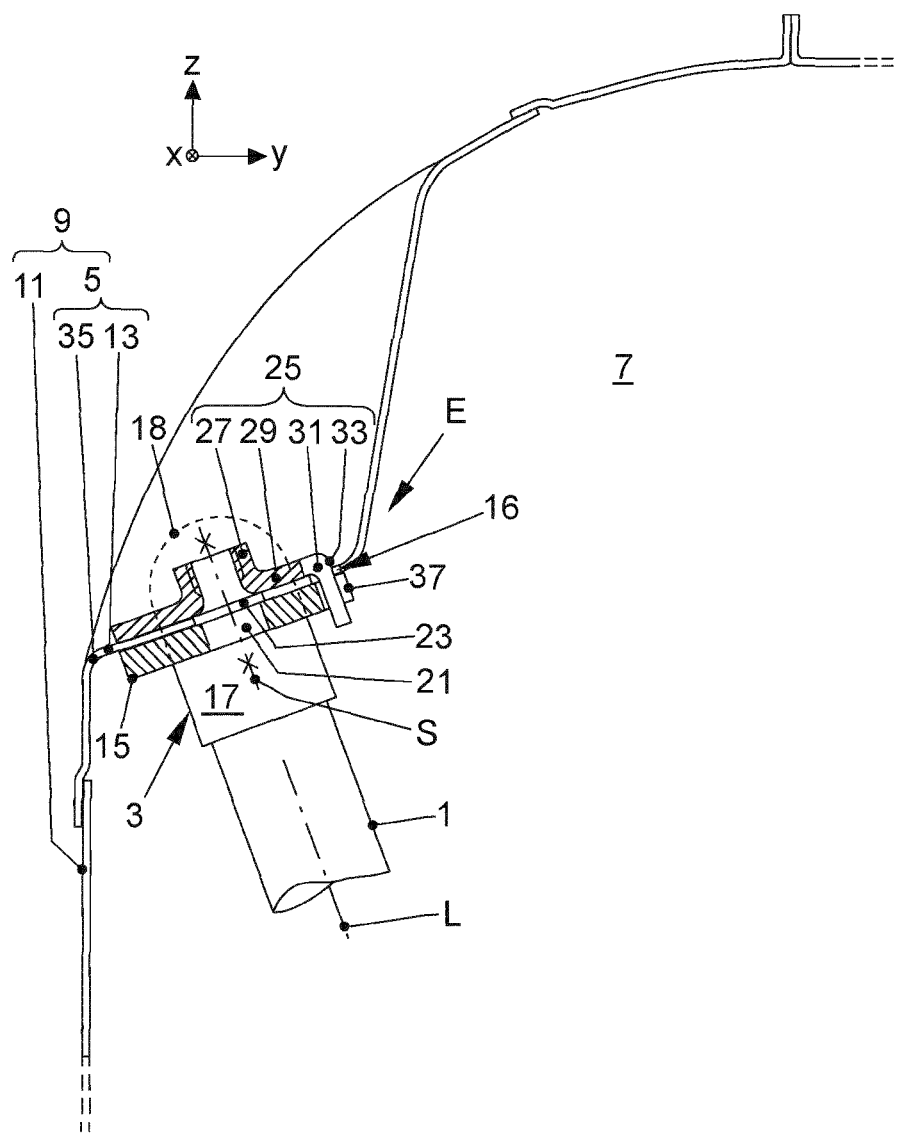
FIG. 1 shows a schematic sectional illustration of a bearing arrangement with a shock absorber connected in the vehicle wheelhouse.

FIG. 1 shows an assembled state in which a shock absorber 1 is installed via its damper bearing 3 on a damper receptacle 5 in a rear wheelhouse 7 of a vehicle. Wheelhouse 7 is delimited by a wheelhouse sheet metal part 9. Wheelhouse sheet metal part 9 has a shell-shaped sheet metal base body 11 from which a total of two sheet metal embossments of damper receptacle 5 protrude into wheelhouse 7. Only one sheet metal embossment of damper receptacle 5 is shown in FIG. 1. Each of the sheet metal embossments is realized with a screw-on wall 13 directed towards the vehicle bottom and to each of which a mounting flange 15 of a damper bearing 17 of shock absorber 1 is connected in a screw connection S.

Figure 2:
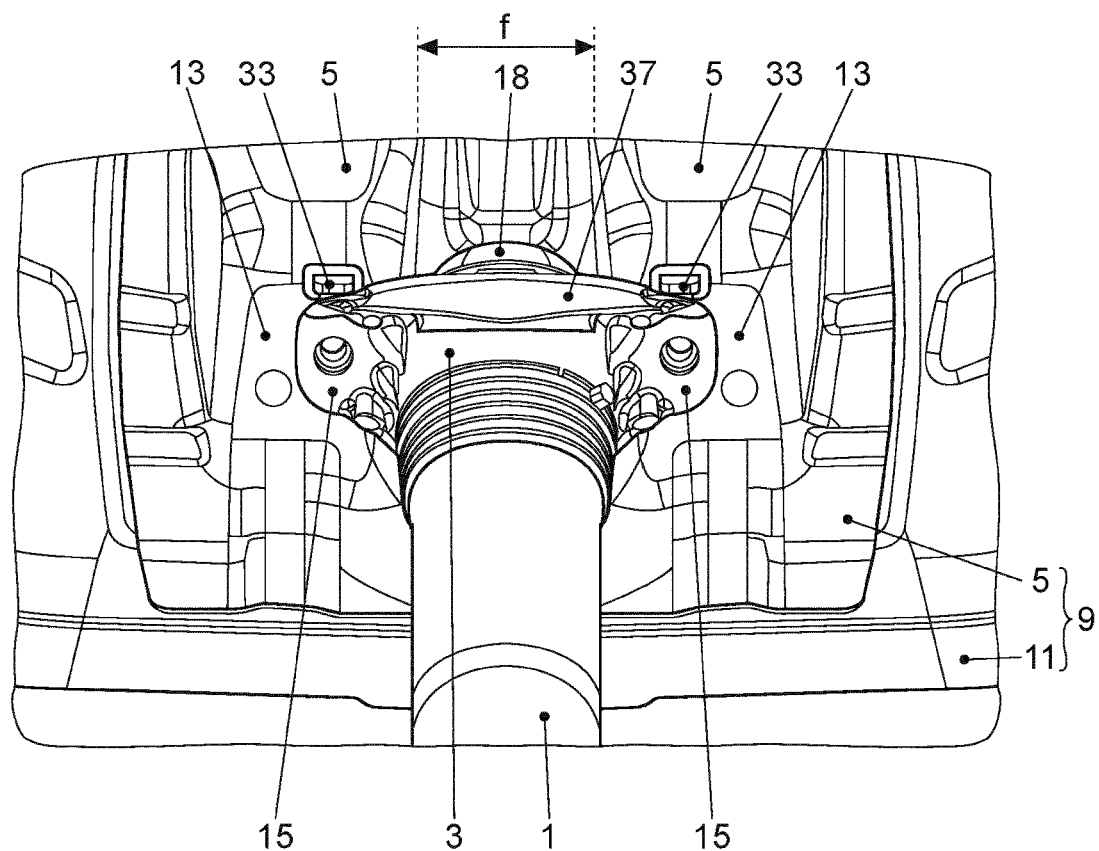
FIGS. 2 to 4 each show further views by means of which the bearing arrangement is illustrated.
Figure 3:
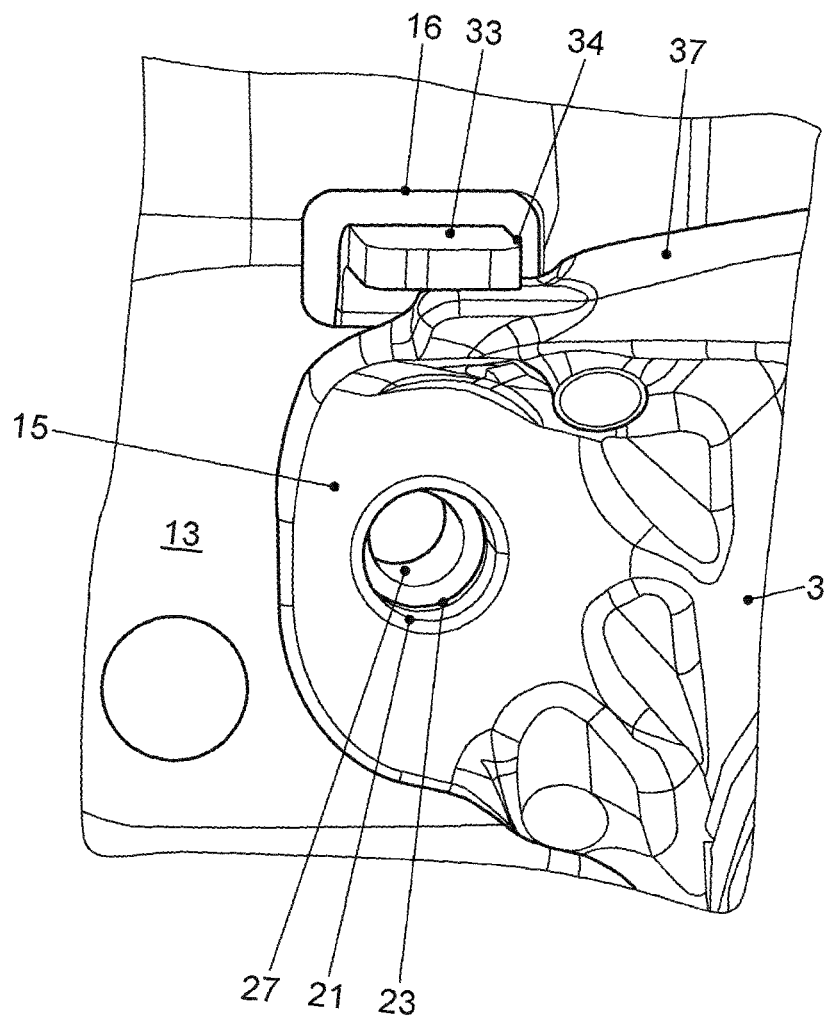
Figure 4:
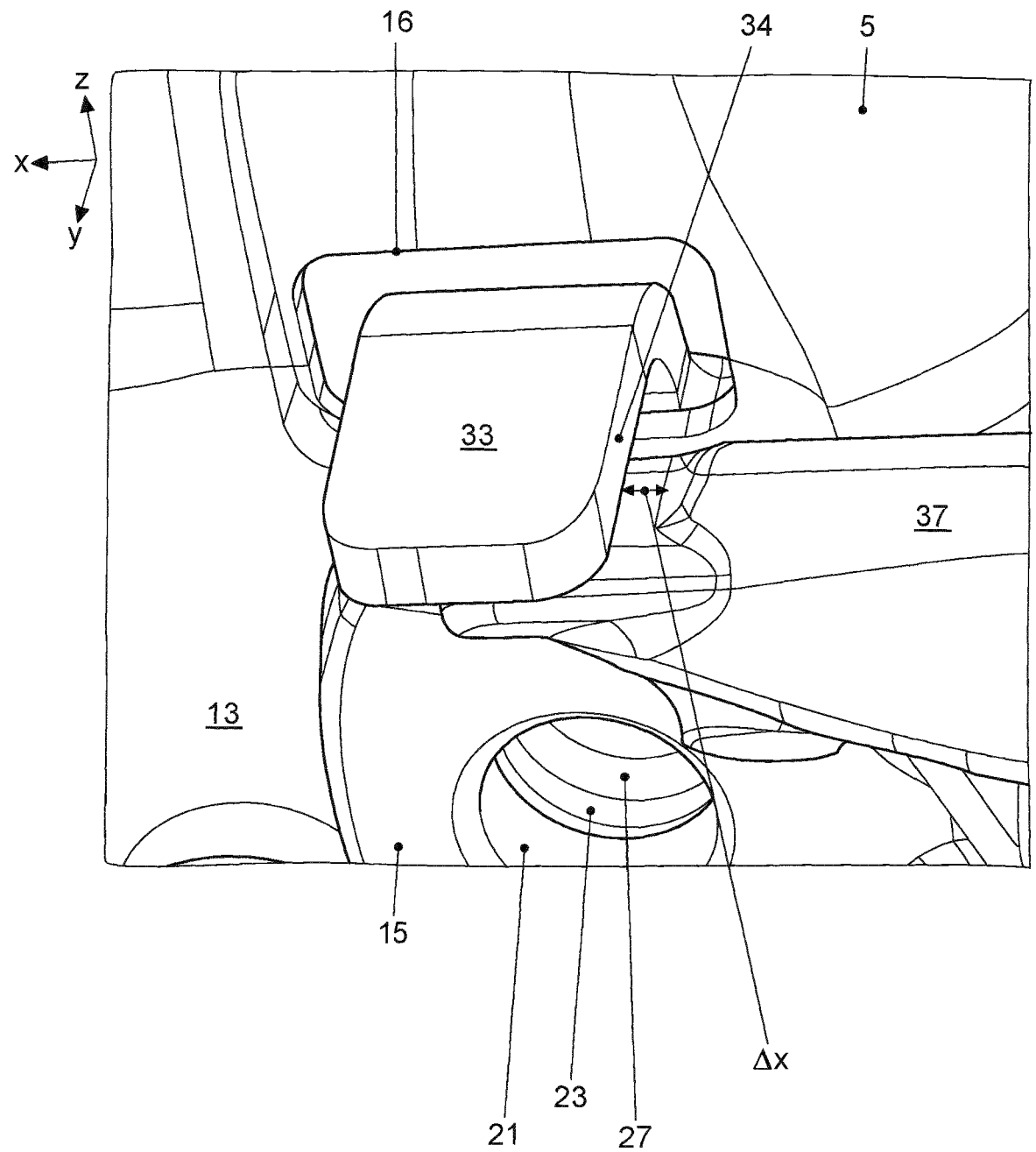

In FIG. 1, damper bearing 3 of shock absorber 1 has a bearing housing 17 which, with reference to a shock absorber longitudinal axis L, has the two diametrically opposite mounting flanges 15, projecting radially outwards (see FIG. 2). Each of mounting flanges 15 is in a screw connection S with screw-on wall 13 of the respective damper receptacle 5.

Screw connection S has a screw bolt, which is guided from below the vehicle through a screw hole 21 of the respective mounting flange 21 of damper bearing 3 and through a screw hole 23 in screw-on wall 13 of the respective sheet metal embossment of damper receptacle 5. The screw bolt is screwed with its bolt tip to a threaded plate 25. In FIG. 1, this rests loosely on the side of screw-on wall 13, said side facing away from wheelhouse 7. In FIG. 1, threaded plate 25 has a threaded hole 27 with an internal thread which is in threaded engagement with the screw bolt. According to FIG. 1, threaded plate 25 has a flat plate base body 29 in which threaded hole 27 is formed. A positioning sheet metal tab 33 is angled from plate base body 29 at a bending edge 31. This is guided through a through-opening 16 in screw-on wall 13 and protrudes into wheelhouse 7.

In FIG. 1, screw-on wall 13 of damper receptacle 5 merges into the shell-shaped sheet metal base body 11 in the vehicle transverse direction y toward the vehicle interior at a sheet metal transition 35. In FIG. 1, mounting flange 15 of damper bearing 3, when viewed in the vehicle transverse direction y, is arranged between positioning sheet metal tab 33 and sheet metal transition 35.

As can be seen further from FIG. 2, the two sheet metal embossments of damper receptacle 5 are spaced apart from one another in the vehicle longitudinal direction x via a longitudinal clearance f. The cylindrical bearing housing 17 projects with its housing top side 18 without contact into the longitudinal clearance f.

Bearing housing 17 in FIGS. 1 to 4 also has a longitudinal stop element 37, which, when viewed in the vehicle longitudinal direction x, is arranged in longitudinal alignment between the two positioning sheet metal tabs 33 and is spaced apart with a slight movement play $\Delta x$ (FIG. 4) from a respective facing cut edge 34 of positioning sheet metal tab 33.

Figure 5:
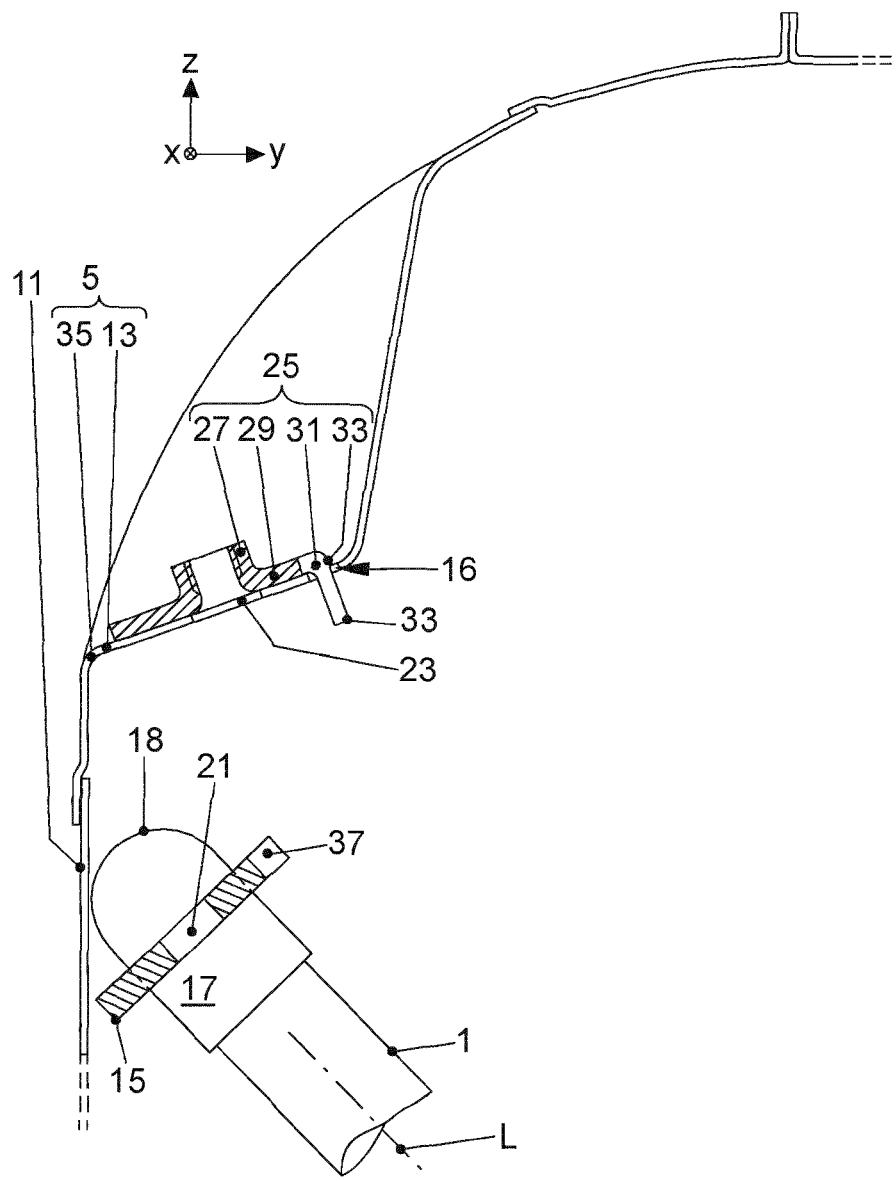
FIGS. 5 and 6 each show views corresponding to FIG. 1, by means of which an installation sequence for the shock absorber installation in the vehicle wheelhouse is illustrated.
Figure 6:
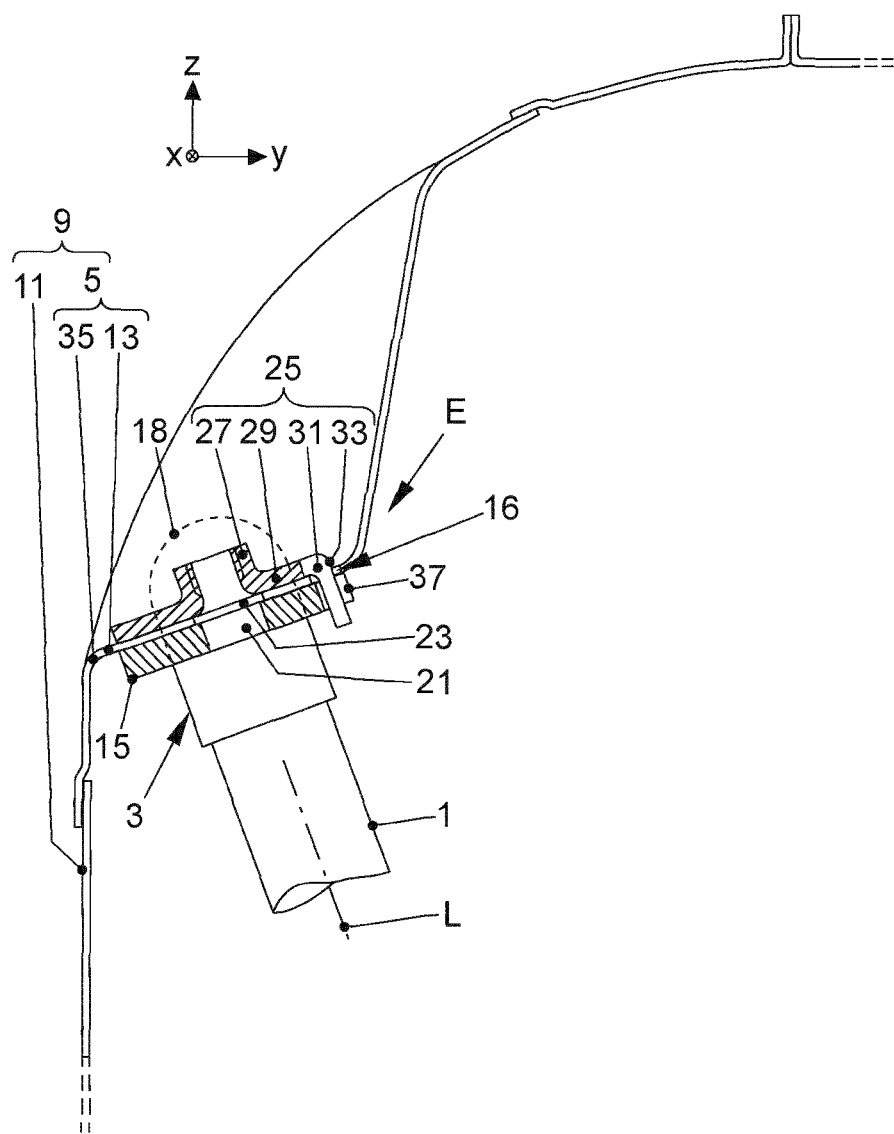

An installation sequence for connecting shock absorber 1 to wheelhouse sheet metal part 9 of the vehicle is described below with reference to FIGS. 5 and 6: Accordingly, shock absorber 1 is inserted in a joining direction F (FIG. 5) from below the vehicle into wheelhouse 7, specifically until it reaches the installation position E (FIG. 6), in which the two mounting flanges 15 of bearing housing 17 abut against the two positioning sheet metal tabs 33. During the insertion movement in the joining direction F (FIG. 5), the housing upper part 18 slides along the shell-shaped sheet metal base body 11 in the vehicle upward direction up to installation position E. In installation position E, the housing upper part 18 of damper bearing 3 is positioned without contact between the two sheet metal embossments of damper receptacle 5, whereas mounting flanges 15 are brought into flat contact with the respective screw-on wall 13 of damper receptacle 5. In addition, in the installation position E, longitudinal stop element 37 is in longitudinal alignment between the two positioning sheet metal tabs 33.

The installation position E is designed in such a way that screw hole 21 of the respective mounting flange 15, screw hole 23 of screw-on wall 13 of damper receptacle 5, and threaded hole 27 of threaded plate 25 are aligned longitudinally in the screw direction. From this point, in a subsequent process step, the screw bolt can be screwed without interfering contours in order to connect bearing housing 3 of shock absorber 1 to the two sheet metal embossments of damper receptacle 5 of wheelhouse 7.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A bearing arrangement for a damper bearing of a shock absorber in a wheelhouse of a vehicle, the bearing arrangement comprising:
   a damper receptacle formed in a wheelhouse sheet metal part delimiting the wheelhouse, which damper receptacle is screw-connected to the damper bearing of the shock absorber;
   a threaded bolt guided through a damper bearing screw hole and through a screw hole of the damper receptacle and a bolt tip of the threaded bolt is screwed together with an internal thread of a reinforcement element that is arranged on a side of the damper receptacle, said side facing away from the wheelhouse;
   a positioning aid associated with the damper receptacle, via which positioning aid the damper bearing of the shock absorber is adapted to be pre-positioned in an assembly process up to an installation position in which the screw hole of the damper bearing, the screw hole of the damper receptacle, and the reinforcement element internal thread are oriented flush with respect to each other in a screw direction,
   wherein the positioning aid is a material-uniform and/or integral component of the reinforcement element so that a relative position between the positioning aid and the reinforcement element internal thread is fixed, independently of component and/or production tolerances in the damper receptacle and/or in the wheelhouse sheet metal part.

2. The bearing arrangement according to claim 1, wherein the wheelhouse sheet metal part has a shell-shaped sheet metal base body from which at least one sheet metal embossment, forming the damper receptacle, protrudes into the wheelhouse wherein the damper receptacle has at least one screw-on wall directed towards the vehicle bottom, with a joining surface which is in contact with a mounting flange of the damper bearing, and wherein the screw holes through which the screw bolt is guided are formed in the screw-on wall of the damper receptacle and in the damper bearing mounting flange.

3. The bearing arrangement according to claim 1, wherein the reinforcement element is a threaded plate, and wherein the reinforcement element is in loose contact with the side of the screw-on wall of the damper receptacle, said side facing away from the damper bearing, and wherein, when the screw connection is tightened, the damper bearing mounting flange and the screw-on wall of the damper receptacle are clamped between the reinforcement element and a bolt head of the screw bolt.

4. The bearing arrangement according to claim 3, wherein a through-opening, through which the positioning aid is guided and protrudes into the wheelhouse, is formed in the damper receptacle or in the screw-on wall of the damper receptacle, and wherein the positioning aid projects beyond the damper receptacle by a component height, and wherein the positioning aid is a positioning sheet metal tab, which is formed on the reinforcement element and is angled in particular at a bending edge aligned in a vehicle longitudinal direction from a threaded plate base body.

5. The bearing arrangement according to claim 1, wherein the damper receptacle has two sheet metal embossments which, when viewed in a vehicle longitudinal direction, are spaced apart from one another by a longitudinal clearance, and wherein each of the sheet metal embossments of the damper receptacle is in a screw connection with a respective mounting flange of the damper bearing, and wherein a bearing housing upper side of the damper bearing protrudes without contact into the longitudinal clearance between the two sheet metal embossments of the damper receptacle.

6. The bearing arrangement according to claim 1, wherein the screw-on wall of the damper receptacle merges into the shell-shaped sheet metal base body at a transition edge towards a vehicle bottom, and wherein, when viewed in a vehicle transverse direction, the mounting flange of the bearing housing is arranged between the positioning aid and the transition edge.

7. The bearing arrangement according to claim 5, wherein the bearing housing of the shock absorber has a longitudinal stop element, which, when the shock absorber is correctly positioned, is arranged in longitudinal alignment between two positioning aids of the damper receptacle or between the facing cut edges of the positioning sheet metal tabs.

8. The bearing arrangement according to claim 1, wherein during the assembly process, the shock absorber, not yet mounted on the vehicle body, is guided in a joining direction from below the vehicle into the wheelhouse up to the installation position, a—housing upper part of the damper bearing sliding towards the vehicle top along a—shell shaped sheet metal base body until it reaches the installation position, in which two mounting flanges are brought into abutment with two—positioning aids of the damper receptacle and a—longitudinal stop element of the damper bearing is brought into longitudinal alignment between the two positioning aids of the damper receptacle so that in the installation position screwing together of the damper bearing without interfering contours to the damper receptacle is enabled.

* * * * *